Aug. 21, 1962     L. SCHIERHOLZ     3,050,031
NECK COLLAR FOR THE STALLING OF COWS
Filed April 20, 1960

INVENTOR
LOUIS SCHIERHOLZ
BY Ezekiel Wolf, Wolf & Greenfield

United States Patent Office 3,050,031
Patented Aug. 21, 1962

3,050,031
NECK COLLAR FOR THE STALLING OF COWS
Louis Schierholz, Bremen, Germany
Filed Apr. 20, 1960, Ser. No. 23,479
Claims priority, application Germany Apr. 23, 1959
5 Claims. (Cl. 119—147)

This invention relates to a neck collar or stanchion, in particular, a neck collar having two side-bars a certain distance apart, between which the neck of the cow is enclosed.

The neck collars of conventional design have the disadvantage that they render it difficult for the cow to get up from the floor. The invention is based on recognition of the fact that the shape of the hitherto used neck collars is not sufficiently well adapted to the natural movements of the animals, and especially not to the movements which the cattle make for getting up in the stall. For raising from the floor a cow gets at first on its hindhand, which causes the shoulders of the animal to perform arcuate movements in a forward direction in vertical planes parallel to the body axis of the animal. A neck collar of conventional design, however, prevents such forward movements as the neck collar presses directly against the animal's shoulders.

For avoiding this disadvantage the neck collar according to the invention is so designed that each side-bar projects in its lower portion, at about the height of the shoulders of the lying animal, forwards and outwards of the animal's body and beyond the plane of the upper portions of the side-bars, recurving thereafter at its lower end, to the plane of the upper portions. This involves each side-bar being bent twice in opposite directions, the first—outward—bend being situated at about 0.35 to 0.45 of the total height of the collar from its lower end. This has for consequence that, when a cow lies down, there is always a free space left between the shoulders of the animal and the neck collar.

The present invention will be clearly understood in connection with the accompanying drawings in which—

Figures 1, 2, 3:
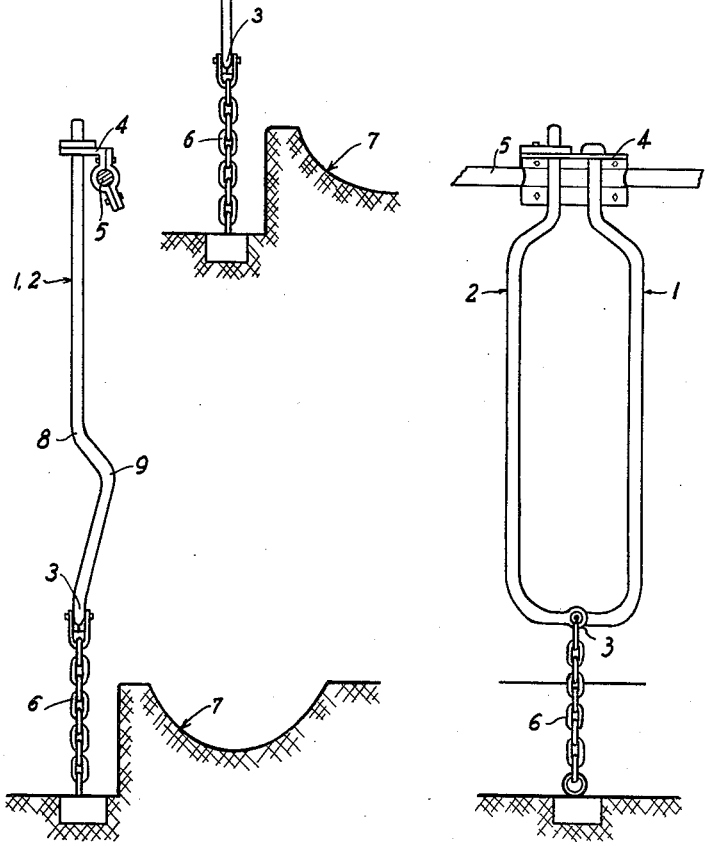
FIG. 1 is a side view of a neck collar of conventional design.
FIG. 2 is a side view of a neck collar according to the invention.
FIG. 3 is a front view of the neck collar shown in FIG. 2, which is identical with the front view, not shown, of the neck collar according to FIG. 1.

The neck collars shown consist of two essentially parallel side-bars 1, 2 arranged at distance from each other in a direction at right angles to the plane of the drawing in FIGS. 1 and 2. The two side-bars 1, 2 are hingedly connected at their lower ends 3 and held together at their upper ends by a crosspiece 4 and a suitable catch mechanism permitting opening of the collar. The side-bars are free to rotate in the corresponding openings of the crosspiece. The crosspiece 4 and thereby upper end of the collar is secured to an overhead rail or pipe 5 whilst the lower end 3 is anchored to the floor of the stall by a chain 6. With the neck collar in its normal position, the side-bars 1, 2 are symmetrically disposed about the longitudinal and vertical plane of symmetry of the stall and at a substantially constant distance from each other in a direction perpendicular to that plane.

The neck collars for the stalling of cows are usually so suspended that they are somewhat inclined to the vertical, with the upper end slightly more backward than the lower end when seen from the side of the manger 7. This inclined arrangement of the neck collar serves to oblige the cow, when getting up from the floor, to step back to the excrement gutter or a conveyor belt so that the excrements will not drop on the floor space below the cow.

The neck collars of conventional design have completely straight side-bars as shown in FIG. 1, but experience has shown that such straight side-bars are potentially dangerous to the cattle. It may easily occur that a cow loses its footing when getting up from the floor on account of the backward pressure exerted on the animal's shoulders by the neck collar and injures its knees or claws.

The neck collar according to the invention represented in FIGS. 2 and 3 has side-bars with two successive opposite bends 8, 9 in planes parallel to the vertical center plane of the neck collar so that, at about one third of the total height of the collar from the floor, both side-bars jut outwards from the cow to a greater distance— about 2½ to 4½ inches—than would be the case for straight side-bars. The portions of the side-bars lying below the opposite bends are preferably straight-lined, have a length of about ¼ to ⅔ of the total height of the collar, and are inwardly inclined at an angle of about 7° to 14° to the upper portions of the side-bars so as to return to the plane of the upper portions at their lowermost ends. When a cow gets down, its shoulders move downwards along the upper straight parts of the side-bars until they automatically become free in the forwardly projecting lower portions of the side-bars. When an animal starts getting up from the floor its shoulders can at first freely move forwards and are restrained as usual after the cow has entirely risen. Any unnatural movements which the cattle have to make in conventional type neck collars having straight side-bars are therefore eliminated by the use of neck collars according to the invention.

I claim:

1. A neck collar for stalling of cows adapted to be secured to an overhead rail and anchored to the floor at its lower end comprising a pair of spaced coplanar side-bars having parallel elongated parts lying in a single plane at their upper portion and having converging bends at their lower and upper ends, means pivotally interengaging said bends at said lower end, means for securing said bends at said upper end in fixed relation to one another, said parallel elongated parts each having a pair of parallel bends in their lower portions in parallel planes normal to said single plane forming approximately the lower third of each said parts into upper forwardly and contiguous lower rearwardly inclined sections from said single plane whereby the lower parts of said sidebars project forwardly of said single plane to accommodate the movements of cows when lying and moving to a standing position.

2. A stalling device as set forth in claim 1 wherein said upper and lower converging bend all lie in said single plane.

3. A stalling device as set forth in claim 2 wherein said lower rearwardly inclined section projects forwardly from said single plane at an angle of between 7° and 14°.

4. A stalling device as set forth in claim 3 wherein said lower converging bends terminate in colinear sections pivotally interengaged at adjacent ends.

5. A stalling device as set forth in claim 4 wherein said upper converging bends terminate in parallel end sections lying in said single plane and adapted to be rigidly interlocked.

References Cited in the file of this patent

UNITED STATES PATENTS

| 313,524 | Prescott et al. | Mar. 10, 1885 |
| 1,119,649 | Shoemaker | Dec. 1, 1914 |
| 1,337,925 | Lewis | Apr. 20, 1920 |

FOREIGN PATENTS

| 52,499 | Denmark | Dec. 28, 1936 |
| 83,500 | Norway | Apr. 12, 1954 |